Nov. 13, 1934.    G. F. MAUGHMER    1,980,814
COMPRESSOR PLANT
Filed Oct. 17, 1933

Inventor:
Glenn F. Maughmer,
by Harry E. Dunlow
His Attorney.

Patented Nov. 13, 1934

1,980,814

UNITED STATES PATENT OFFICE 1,980,814

COMPRESSOR PLANT

Glenn F. Maughmer, Los Angeles, Calif., assignor to General Electric Company, a corporation of New York Application October 17, 1933, Serial No. 693,919

3 Claims. (Cl. 230—114)

The present invention relates to compressors or blowers which may be operated as exhausters or boosters, more specifically to compressor plants comprising a plurality of compressors which at times are operated collectively in series connection and at times individually.

The object of my invention is to provide an improved construction and arrangement of compressor plants whereby two or more compressors may be connected in series or operated individually as desired.

A more specific object of the invention is to provide an arrangement in which different operating conditions of a plurality of compressors are obtained by a minimum number of valve means.

For a consideration of what I consider to be novel and my invention, attention is directed to the following description and the claims appended thereto in connection with the accompanying drawing.

Figure 1:
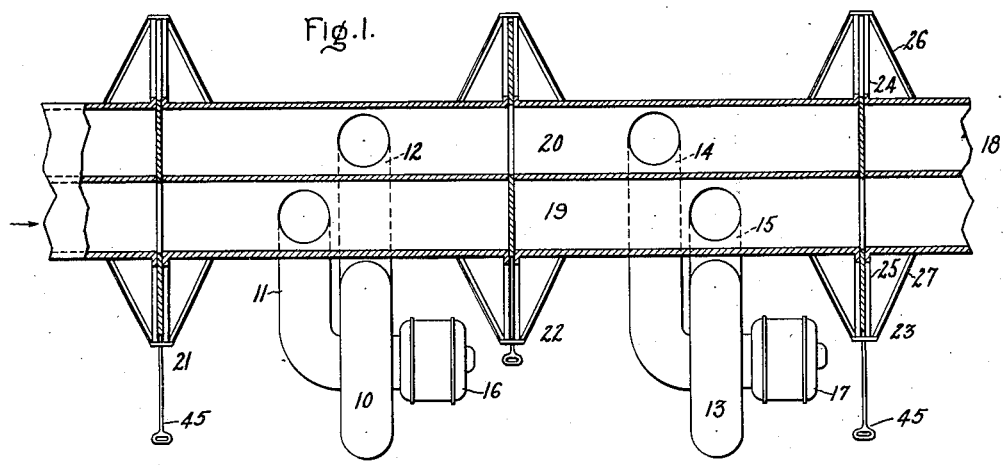
Figure 2:
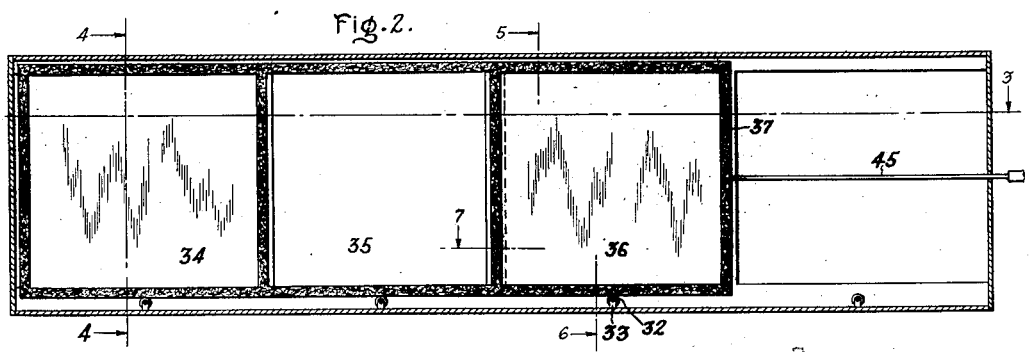
Figure 3:
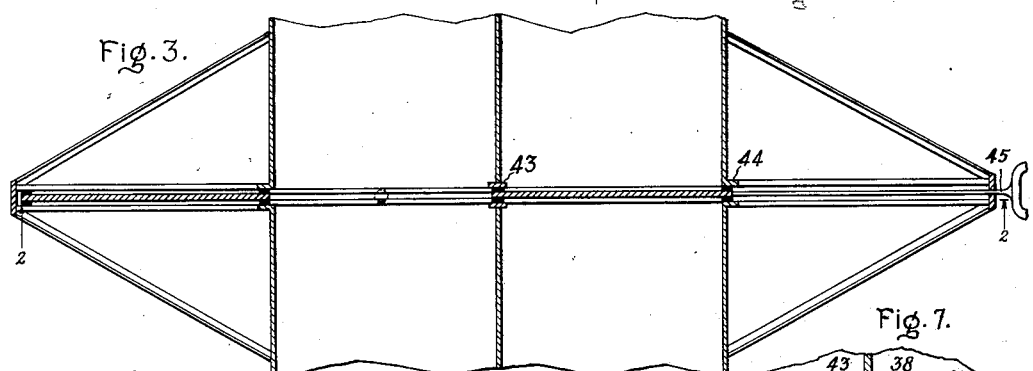
Figure 4:
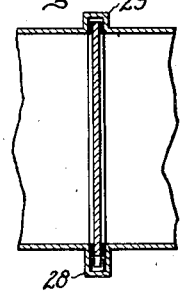
Figure 5:
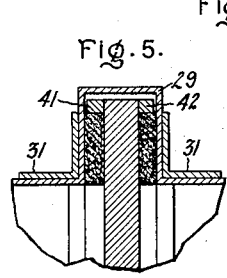
Figure 6:
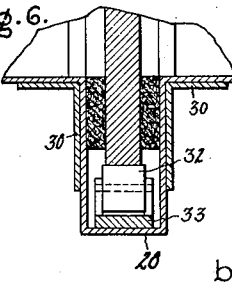
Figure 7:
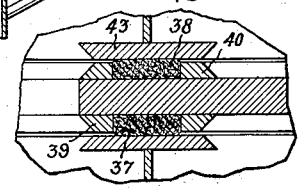

In the drawing, Fig. 1 is a diagrammatic illustration of a compressor plant embodying my invention; Fig. 2 is a detail view of one of several valve means provided in Fig. 1; Fig. 3 is a sectional view along lines 3—3 of Fig. 2, Fig. 2 being a sectional view along lines 2—2 of Fig. 3; Fig. 4 is a section along line 4—4 of Fig. 2; Figs. 5 and 6 are sectional views to an enlarged scale along lines 5 and 6 respectively of Fig. 2; and Fig. 7 is an enlarged sectional view along line 7 of Fig. 2.

The compressor plant illustrated by way of example comprises two compressors which may be of different sizes, a first compressor 10 having a suction or inlet conduit 11 and a discharge or outlet conduit 12, and a second compressor 13 having an inlet conduit 14 and an outlet conduit 15. The compressors are driven by motors 16 and 17 respectively. The inlets and outlets of the compressors are connected by conduit means 18, in the present instance shown as being made of sheet metal and having substantially rectangular cross section. More specifically, the conduit means define two channels 19 and 20, the first channel 19 being connected to the inlet 11 of the first compressor and the outlet 15 of the second compressor, whereas the second channel 20 is connected to the outlet 12 of the first compressor and the inlet 14 of the second compressor. In the conduit means adjacent each side of each compressor is a valve means shown as a gate valve 21, 22 and 23 respectively, each valve permitting in one end position the flow of fluid past the valve in one of the channels and preventing the flow of fluid past the valve in the other channel. The stationary member or guide for each valve comprises strips of sheet metal 24 and 25 fastened on opposite sides to the conduit means and held in position by bracers 26 and 27. The lower and upper side of the conduit 18 is formed to define channels 28 and 29 (Fig. 4) of rectangular cross section for grinding the movable valve member. The conduit is reinforced near the channels 28 and 29 by angle irons 30 (Fig. 6) and 31 (Fig. 5). Provided in the lower channel are rollers 32 held on brackets 33 to facilitate movement of the movable valve member or gate. The brackets 33 are fastened to the channel 28 in any suitable manner.

The movable valve member or gate comprises a frame defining three equal fields 34, 35 and 36 having cross sections corresponding to the cross sections of the channels 19 and 20. The fields 34 and 36 are covered by a plate of sheet metal or the like whereas the intermediate field 35 is free to define an opening. Provided on both sides along the outer circumference of each field are packings 37 and 38 respectively held in position by strips of metal 39, 40 (Fig. 7) and 41, 42 (Fig. 5) fastened to the movable member. The packings slidably engage the walls of the lower and upper channels 28 and 29 respectively, as well as flanged portions 43 (Figs. 3 and 7) and 44 (Fig. 3) of the conduit. A handle 45 for positioning the valves is fastened to one end of each movable member.

The operation of the arrangement is as follows: The valves in Fig. 1 are positioned to permit series operation of the two compressors. Valves 21 and 23 close the channel 20, permitting flow through the channel 19, and valve 22 closes channel 19, permitting flow through channel 20. In this position gas may flow from the left-hand end of the channel 19 to the inlet of the compressor 10 and from the outlet 12 of the latter to the inlet 14 of the compressor 13 to be discharged through the outlet 15 of the latter and the right-hand end of the channel 19. Assuming that during this condition the compressors operate as exhausters, the plant may be put into a condition to operate as booster simply by moving all valves into the opposite positions.

Now let us assume that compressor 10, which may be a large compressor, is to be operated individually. To this end compressor 13 is put into an inoperative condition, and the valve 23 moved into a position opposite that shown in the drawing by pushing the handle 45 of the valve 23 inward, to close the channel 19 and open the channel 20. Gas may then flow from the left-hand end of the channel 19 through the compressor 10 and from the discharge 12 of the latter to the right-hand end of the channel 20. In this case, as in any other case, we may change from exhauster operation to booster operation by simply reversing all valve positions.

In order to operate compressor 13 individually, which compressor may be smaller than compressor 10, valve 21 is moved into the opposite position, closing the channel 19 and opening the channel 20. Gas may then flow into the left-hand end of channel 20 to the inlet 14 of the compressor 13 and discharge from the outlet 15 of the latter through the right-hand end of the channel 19.

With my invention I have accomplished an improved arrangement for compressor plants whereby few valves are necessary for obtaining different operating conditions of the compressors. I have shown that with two compressors only three valves are needed for permitting operation of both compressors in series connection and operation of each of the compressors individually. This simplifies the operation of compressor plants to a considerable extent and also reduces the initial cost by the saving of conduits and valves. In addition it improves the efficiency at which the plant may be operated during changing load conditions.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a compressor plant, the combination of two compressors, conduit means defining a channel connected to the inlet of the first compressor and to the outlet of the second compressor and another channel connected to the outlet of the first and the inlet of the second compressor, and valve means in the conduit means on both sides of each connection for connecting in one position the compressors in series and for preventing operation of one of the compressors in another position.

2. In a compressor plant, the combination of two compressors, conduit means defining a channel connected to the inlet of the first and to the outlet of the second compressor and another channel connected to the outlet of the first and the inlet of the second compressor, a single valve means at the ends of each channel, and a gate valve in the conduit means intermediate the compressor connections for connecting in one position the compressors in series and for preventing operation of one of the compressors in another position.

3. In a compressor plant, the combination of two compressors, conduit means defining a channel connected to the inlet of the first and to the outlet of the second compressor and another channel connected to the outlet of the first and to the inlet of the second compressor, a single valve means at the ends of each channel, and a single valve means in the conduit means intermediate the compressor connectors, each valve means permitting in a certain end position the flow of fluid through one channel past the valve means and preventing the flow of fluid through the other channel past the valve means.

GLENN F. MAUGHMER.